United States Patent
Zipperle et al.

[11] Patent Number: 6,131,242
[45] Date of Patent: Oct. 17, 2000

[54] DAMPING DEVICE

[75] Inventors: Ralf Zipperle, Althengstett; Bernd Schenk, Horb, both of Germany

[73] Assignee: DaimlerChrysler AG, Stuttgart, Germany

[21] Appl. No.: 09/113,903

[22] Filed: Jul. 13, 1998

[30] Foreign Application Priority Data

Jul. 12, 1997 [DE] Germany .......................... 197 29 900

[51] Int. Cl.[7] ........................................... F16F 9/14
[52] U.S. Cl. ........................... 16/82; 296/37.8; 296/37.9; 188/82.1
[58] Field of Search ................... 16/82; 296/37.8, 296/37.9, 37.12; 188/82.1

[56] References Cited

U.S. PATENT DOCUMENTS

| | | | |
|---|---|---|---|
| 4,426,752 | 1/1984 | Nakayama | 16/82 |
| 4,468,836 | 9/1984 | Omata | 16/82 |
| 4,773,242 | 9/1988 | Smith | 16/82 |
| 5,690,194 | 11/1997 | Parker et al. | 188/82.1 |
| 5,887,930 | 3/1999 | Klein | 296/37.9 |

FOREIGN PATENT DOCUMENTS

| | | |
|---|---|---|
| 0771971A1 | 5/1997 | European Pat. Off. ................... 16/82 |
| 0846886A1 | 6/1998 | European Pat. Off. ................... 16/82 |
| 295 18 173 U1 | 2/1996 | Germany . |
| 195 10 749 C1 | 4/1996 | Germany . |
| 296 21 043 U1 | 3/1997 | Germany . |

*Primary Examiner*—Anthony Knight
*Assistant Examiner*—Mark Williams
*Attorney, Agent, or Firm*—Evenson, McKeown, Edwards & Lenahan, P.L.L.C.

[57] ABSTRACT

A damping device is provided for a part that is pivotable between two end positions, with a viscous brake for delaying the pivoting movement. The brake has a brake wheel and a drive member that engages the wheel at a tangent. The wheel and drive member move apart from one another when the part is pivoted, thus causing rotation of the brake wheel. One of the brake wheel and the drive member is in a fixed location and the other is on a lever that is articulated to the part. The articulation point is set so that the displacement travel of the lever within a constant pivot angle of the part increases with the path of the part as it pivots from its first to its second end position with consequent progressive damping characteristics.

25 Claims, 5 Drawing Sheets

DAMPING DEVICE

BACKGROUND AND SUMMARY OF THE INVENTION

This application claims the priority of German application 197 29 900.8-12, filed in Germany on Jul. 12, 1997, the disclosure of which is expressly incorporated by reference herein.

The invention relates to a damping device for a part pivotable between two end positions, with a viscous brake for delaying pivoting movement which includes a brake wheel and a driving member engaging the wheel at a tangent.

Pivotable parts of this kind are represented in automobile construction by doors of glove compartments or other storage or receiving compartments or of auxiliary devices for user comfort that can be pivoted out for use, for example holders for drinking vessels, ashtrays, or the like.

A container of this kind such as an ashtray, storage compartment or the like that can be inserted into an installation opening in the interior of a vehicle (German Patent Document DE 195 10 749 C1) has a housing with a housing opening and a door for closing the housing opening, said door being pivotable from a closed position into an open position and vice versa. For this purpose the door is mounted laterally on two pivot arms each of which is pivotably mounted at one of two opposite side walls of the housing. The door can be locked in its closed position and is moved into its open position by an opening spring after it is unlocked. Two viscous brakes each provided on one side of the door ensure damping of the opening movement and prevent the door from forcibly striking a stop that determines its opening position. Each viscous brake has a pinion that is rotatably mounted at the two housing side walls, and an arcuate toothed segment that meshes with said pinion, said toothed segment being formed on a free end of the pivot arm that projects above the point of rotation. The two viscous brakes produce a braking torque that is constant over the pivoting path of the door, said torque ensuring a harmonic movement of the door only in conjunction with the linear spring characteristic of the opening spring. Since the spring force decreases linearly over the pivot path, it is reduced at the end of the pivot path to the point where a gentle impact of the door against the stop is ensured. In pivotable doors, for example the sealing doors of glove compartments, which move into their open position automatically under the force of gravity after being unlocked, high braking torque is a problem at the beginning of the opening movement and is not sufficiently high at the end of the opening movement to ensure that the door slides smoothly into its end position.

A goal of the invention is to produce a damping device of the species recited at the outset, equipped with economical viacous damping elements also called silicone brakes, which have a progressive damping behavior, in other words their damping action increases over the pivoting path of the part.

This goal is achieved by providing a damping device for a part pivotable between first and second end positions, with a viscous brake for delaying the pivoting movement, said brake having a brake wheel and a driving member engaging said wheel at a tangent, which brake wheel and driving member move relative to one another when the part is pivoted and as a result cause a rotation of the brake wheel, wherein one of the brake wheel and the driving member is located in a fixed location and the other on a lever that is articulated to the part, and wherein the articulation point of the lever is located on the part such that the displacement of the lever within a constant pivot angle of the part increases directly with the pivot path of the part from the first to its second end position.

The damping device according to the invention has the advantage that by introducing the lever and locating the lever articulation point on the pivoting part in the manner described, the pivoting movement of the part from its first end position takes place completely or nearly without braking action and then is increasingly braked with a braking torque that is maximal at the end. In this way, an initiation of the pivoting movement that is rapid and without delay, especially under the influence of gravity, and a sharp braking action upon reaching the second end position are both guaranteed, ensuring that the part slides gently into its end position. The change in braking torque of the viscous brake is caused by the conversion according to the invention of the constant pivoting movement segments of the part into displacement sections of the lever that constantly increase, so that assuming a constant pivoting movement of the part, the relative velocity between the braking wheel and the drive member increases and hence the rotational speed of the brake wheel increases. Since the braking torque of the viscous brake depends on the rotational speed of the brake wheel, the braking torque increases directly with the pivoting path of the part. This applies only to the pivoting movement of the part from its first into its second end position.

The introduction of the lever according to the invention also creates the possibility of transferring a stop that defines the second end position of the part from the part itself to the lever, resulting in a greater freedom of design for designing the part.

Further advantageous features of preferred embodiments of the damping device according to the invention are described herein and in the claims.

According to an advantageous feature of preferred embodiments of the invention, the drive member has associated with it a guide path that extends parallel thereto and the brake wheel is provided with a guide element located at a radial distance from its rotational axis, said element abutting the guide path, with the guide element and guide path being so located and aligned that the brake wheel and drive member are held in mutual engagement. As a result of this design measure, assurance is provided that the driving connection between the driving member and the brake wheel is maintained regardless of the movement kinematics of the lever, from the first end position of the part to the second end position.

According to an advantageous feature of preferred embodiments of the invention, a free-running or decoupling device is provided that is operable during the return pivoting movement of the part from its second into its first end position, said device eliminating the driving connection between the brake wheel and the driving member. A decoupling device of this kind allows a considerable improvement in operating comfort for the part that must be returned from its second position into its first end position by hand, since the operator does not have to perform the return movement against the braking action of the viscous brake. The mutual decoupling of the brake wheel and drive member allows an easy pivoting of the part that is perceived as pleasant, which is especially important when designing the part as the door of a glove compartment.

A free-running or decoupling device of this kind is simple to design if, according to an advantageous feature of certain preferred embodiments of the invention, a second guide path is provided for the guide element, said path running at a distance parallel to and along the first guide path such that when the guide element abuts the second guide path, the brake wheel and drive member are out of engagement. The first and second guide paths are connected at their two ends by a switch so that the guide element is forcibly switched to the respective other guide path.

Other objects, advantages and novel features of the present invention will become apparent from the following detailed description of the invention when considered in conjunction with the accompanying drawings.

DETAILED DESCRIPTION OF THE DRAWINGS

Figure 1:
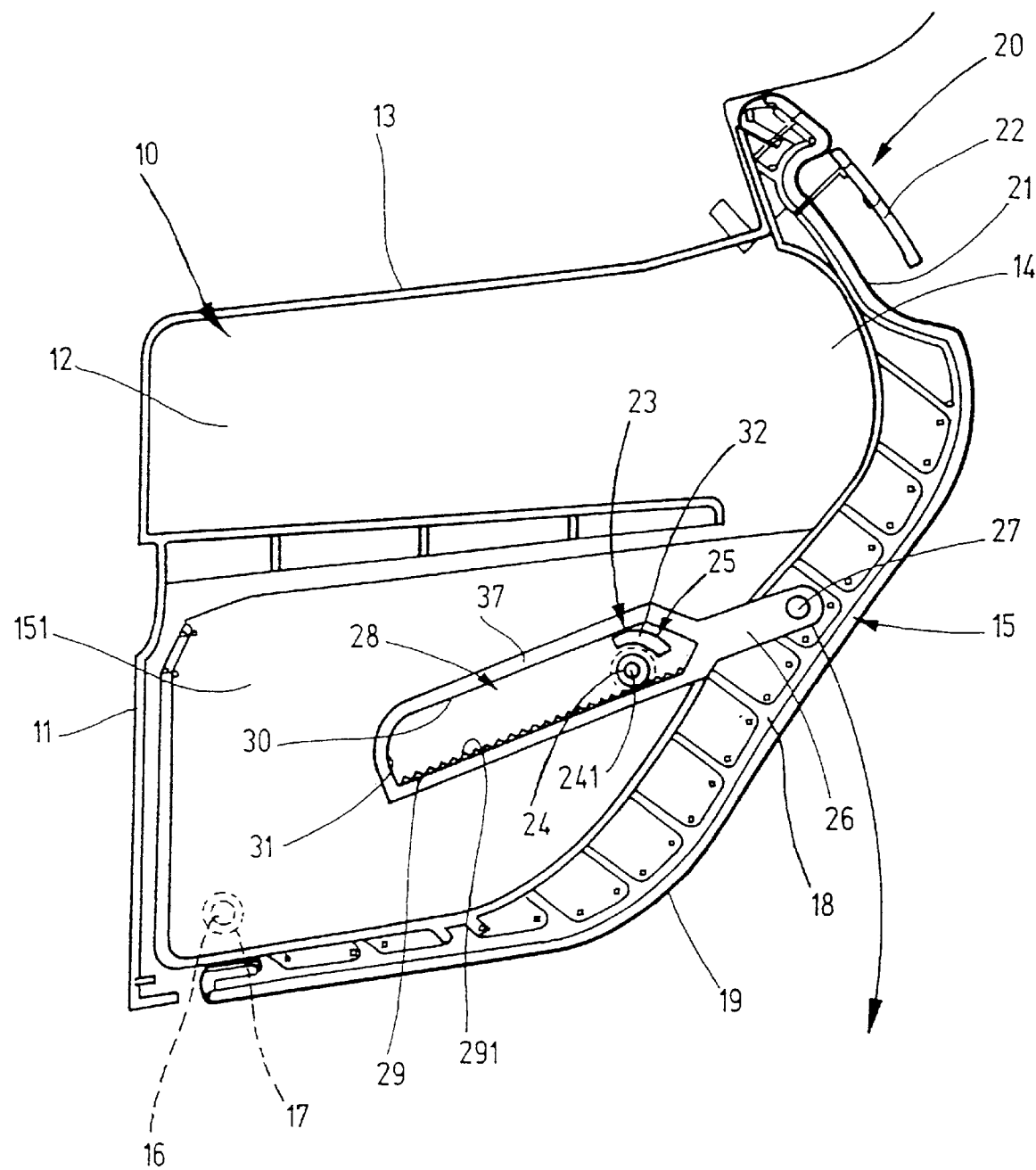
FIG. 1 is a cross section of a glove compartment sealed by a door for a vehicle interior, constructed according to a preferred embodiment of the present invention.

Glove compartment 10, shown in cross section in FIG. 1 and integrated into the instrument panel of a motor vehicle, is delimited by a rear wall 11, two side walls 12 opposite one another, and a top wall 13 that abuts rear wall 11 and side walls 12 and leaves open a housing opening 14 that faces the interior of the vehicle. Housing opening 14 can be closed by a door 15 mounted pivotably on side walls 12 and simultaneously forming the lower wall of the glove compartment. For this purpose, door 15 has two pivot pins 16 each projecting at right angles from its side parts 151 that engage matching receiving bores 17 in side walls 12.

Door 15 extends in the closed position from the leading edge of top wall 13 to the lower edge of rear wall 11. Door 15 is laminated on its upper side with a foam 18 with a closed-pore outer skin 19 or a separate coating and is releasably locked by means of a mechanical locking system designated as 20 as a whole to top wall 13. The unlocking button 22 located in a groove 21 in door 15 is operated manually to release mechanical locking device 20.

Figure 2:
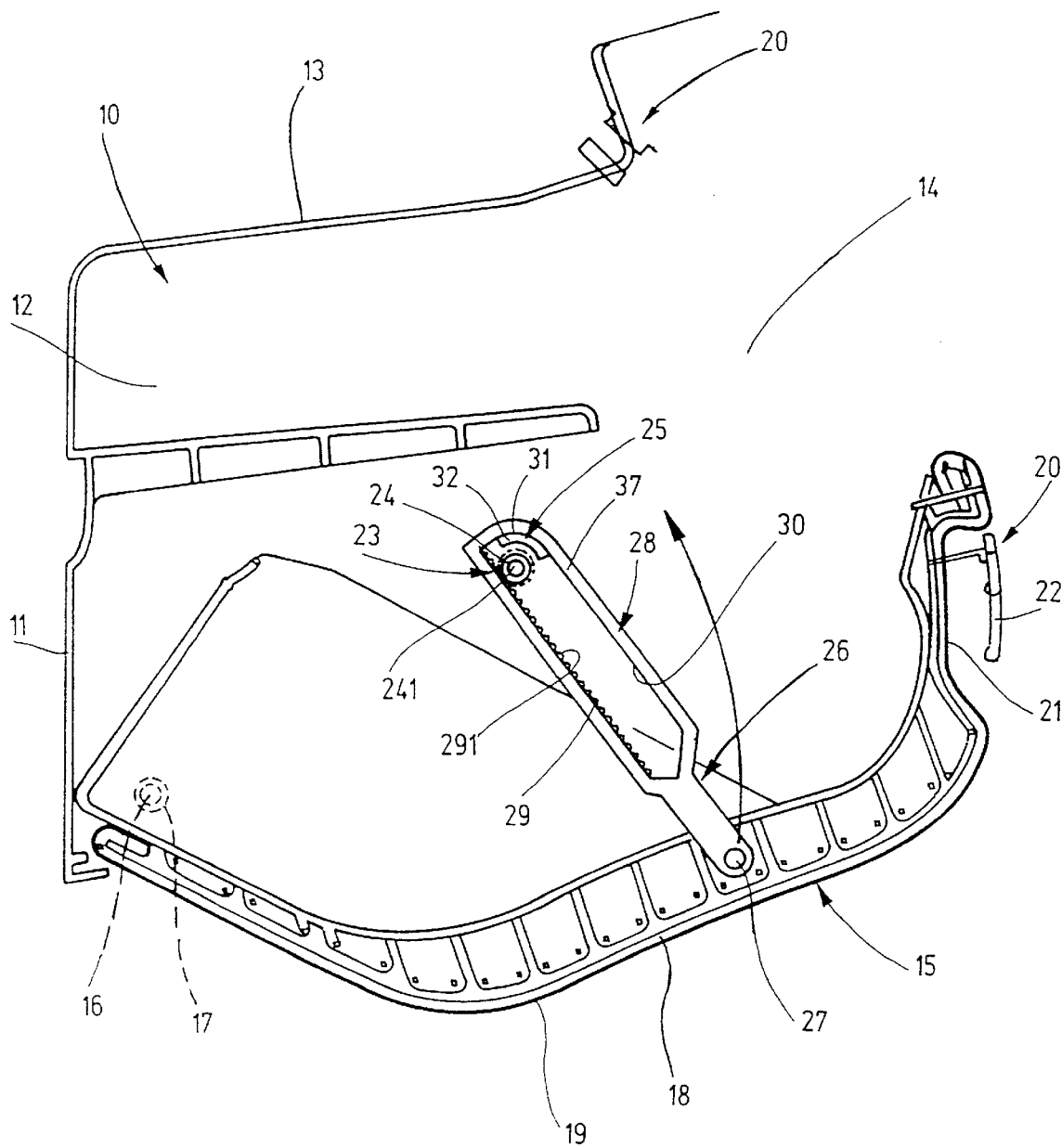
FIG. 2 is a view which is the same as in FIG. 1 but with the glove compartment open.

After unlocking button 22 is operated, door 15 drops under the influence of gravity into its open position shown in FIG. 2 in which it completely opens housing opening 14. To achieve a harmonic movement pattern between the pivoting movement and a gentle transition to its open position without a hard impact, the pivoting movement of door 15 is damped by a viscous brake 23. Viscous brakes of this kind or viscous damping elements or silicone brakes are available commercially as small inexpensive parts. In known fashion, in a viscous damping element, a pinion 24 is mounted on its housing, said pinion being received rotatably around a rotational axis 241 in the housing, and as it rotates in the viscous material, it is subjected to a braking torque that increases with increasing rotational speed of pinion 24. Viscous brake 23 is fastened by its housing to side wall 12 of glove compartment 10, said housing being visible in FIGS. 1 and 2 only as an arcuate segment 32 formed on the housing and constituting a guide element 25.

A lever 26, secured so that it is free to pivot at pivot point 27 on door 15, surrounds pinion 24 and guide element 25 as well as arcuate segment 32 by a closed fork 28. One fork arm is designed as a rack 29 whose teeth 291 mesh with pinion 24 while the opposite fork arm is a guide strip 37 with a guide path 30 formed thereon and opposite teeth 291, said path 30 abutting guide element 25 and thus keeping pinion 24 engaged with teeth 291. At the end of fork 28 that is remote from the pivot point, the two fork arms are connected together by an arcuate cross member which constitutes a stop 31 and, by abutting guide element 25, determines the closing position of door 15. The position of pivot point 27 of lever 26 and the position of pinion 24 are determined so that at the beginning of the opening movement of door 15 the relative movement of rack 29 is nearly zero when engaged by the teeth of viscous brake 23, so that door 15 can be set moving with no damping or with only minimal damping. As the pivoting movement of door 15 proceeds, with the same pivoting travel or pivoting angle, the relative movement of rack 29 relative to pinion 24 increases continuously, so that the rotational movement of pinion 24 and hence the braking torque generated by viscous brake 23 increases, becoming maximal at the end of the pivoting movement and ensuring that stop 31 comes to rest gently on guide element 25.

Figure 4:
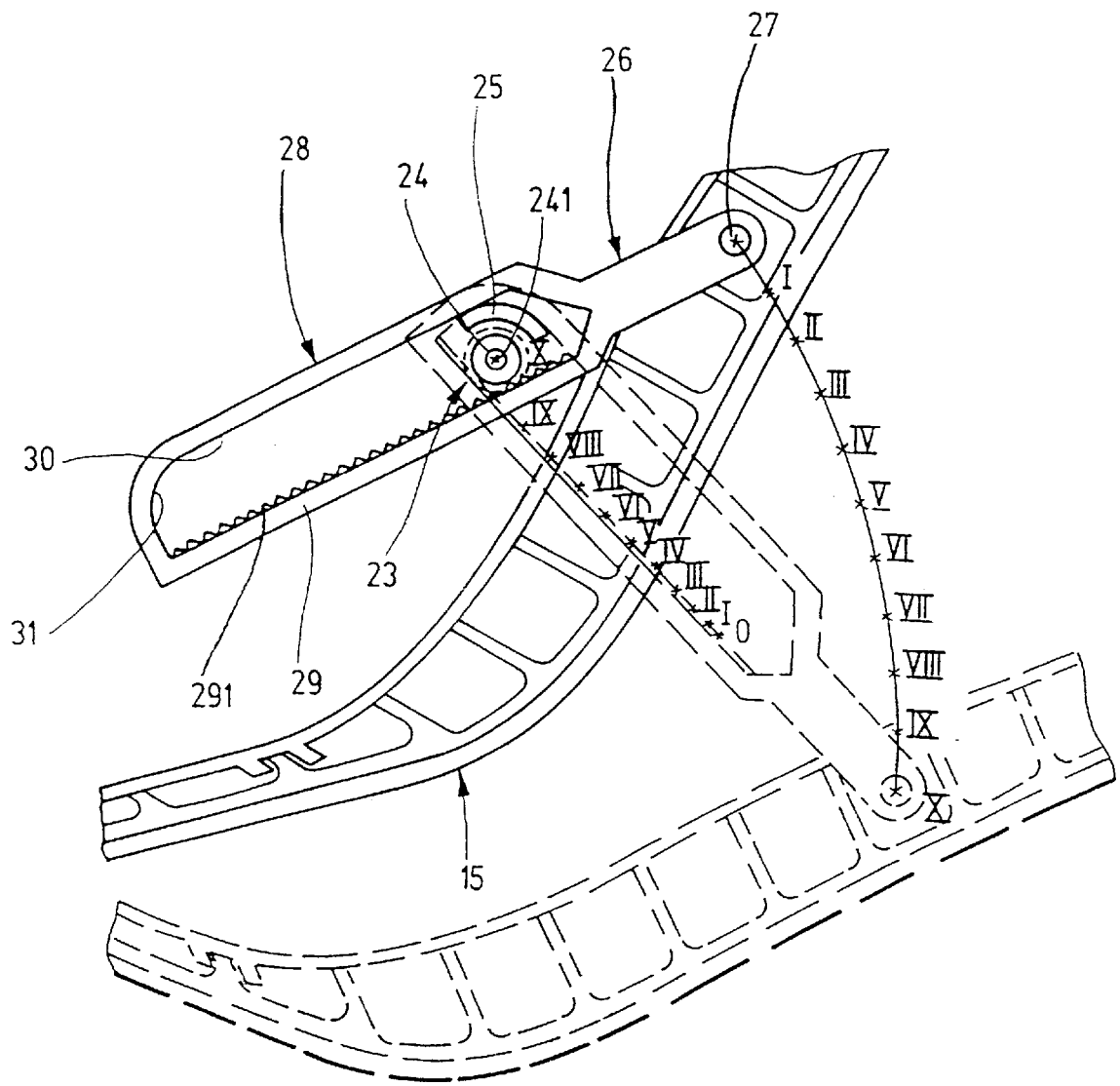
FIG. 4 is an enlarged view of a portion of the door in FIGS. 1 and 2, depicting the closed and open positions.

To illustrate the operation of viscous brake 23, FIG. 4 shows an enlarged section of the movement of door 15 and lever 26 when the glove compartment is opened, with door 15 being represented by solid lines in the closed position and by dashed lines in the open position. The pivoting path of door 15 is divided into ten equal pivoting angles or pivoting path segments and marked with numbers 0–X. The displacement position reached by lever 26 in each pivoting position 0–X of door 15 is marked with the same numbers 0–X. It is evident that as the pivoting travel of door 15 increases, the displacement path of lever 26 between two displacement positions of lever 26 and hence that of rack 29 significantly increases. As the displacement path of rack 29 becomes longer, the braking torque of viscous brake 23 and hence the damping force acting on door 15 increase.

Figure 3:
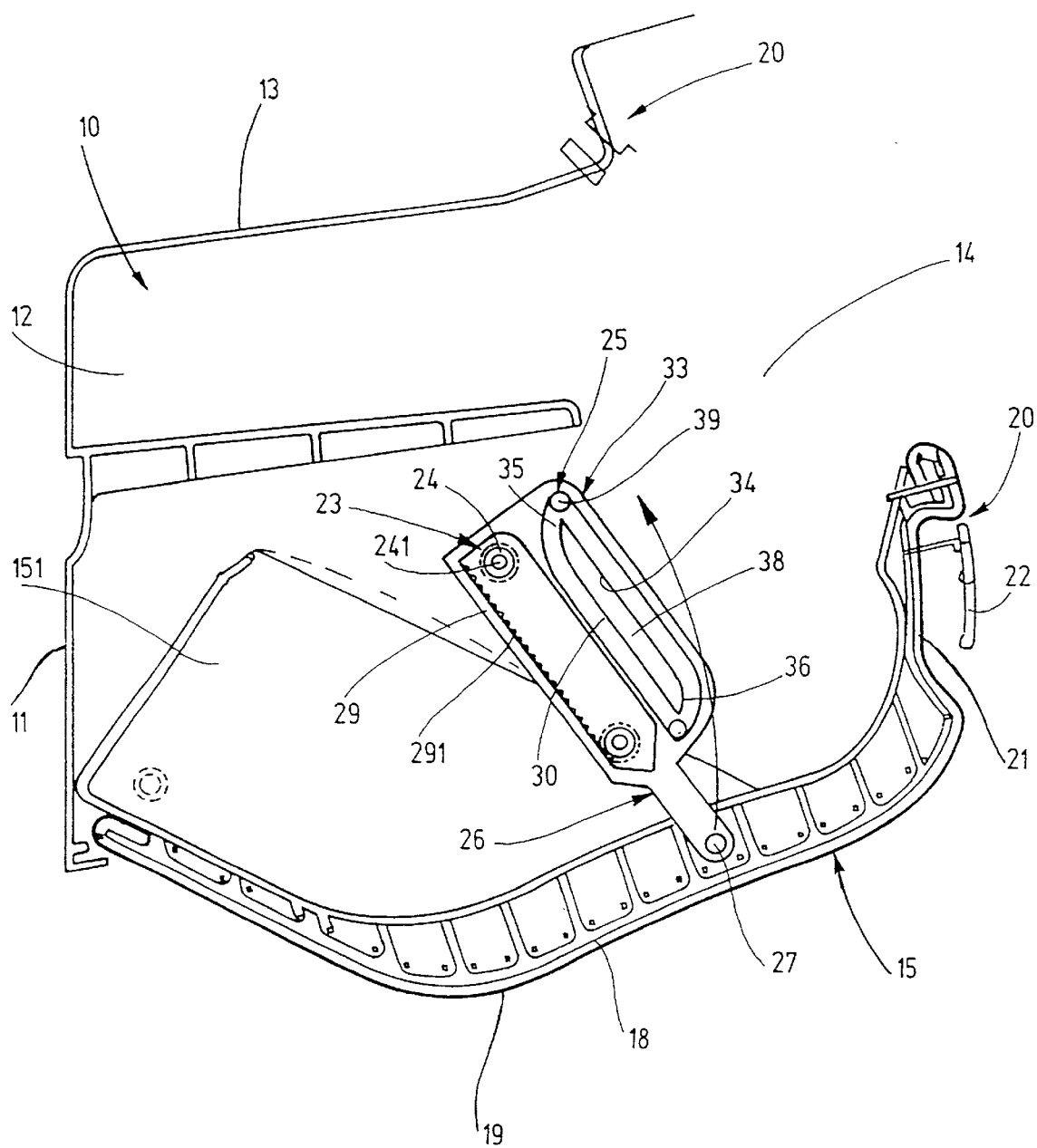
FIG. 3 is a view similar to that in FIG. 2 with a modified door.

The modified embodiment of a glove compartment 10 shown in cross section in FIG. 3 is modified from the designs shown in FIGS. 1 and 2 in that when glove compartment 10 is closed and the manual transfer of door 15 from its open position shown in FIG. 3 to its closed position shown in FIG. 1 required for this purpose is performed, a free-running or decoupling device 33 is engaged that eliminates the driving connection between rack 29 and pinion 24. In the embodiment shown in FIG. 3, free-running or decoupling device 33 is in the form of a second guide path 34 that extends at a distance from and parallel to the first guide path 30 and is designed together with the latter as a link 38 mounted on lever 26. A guide pin 39 engages link 38, said pin projecting from the side wall of glove compartment 10 and forming guide element 25. When guide pin 39 is on guide path 34 it keeps the teeth of rack 29 engaged with pinion 24. On the other hand, if guide pin 39 follows the other guide path 30 parallel to the first, it lifts teeth 291 out of pinion 24 by pivoting lever 26. The two guide paths 30, 34 are connected with one another at their two ends by a switch 35, 36 at each end so that guide pin 39, at the end of the respective guide path 30 or 34, automatically moves to the other guide path 34 or 30. Near switch 35 is the stop 31 that determines the opening position of door 15, against which stop guide pin 39 comes to rest after traveling through switch 35.

Figure 5:
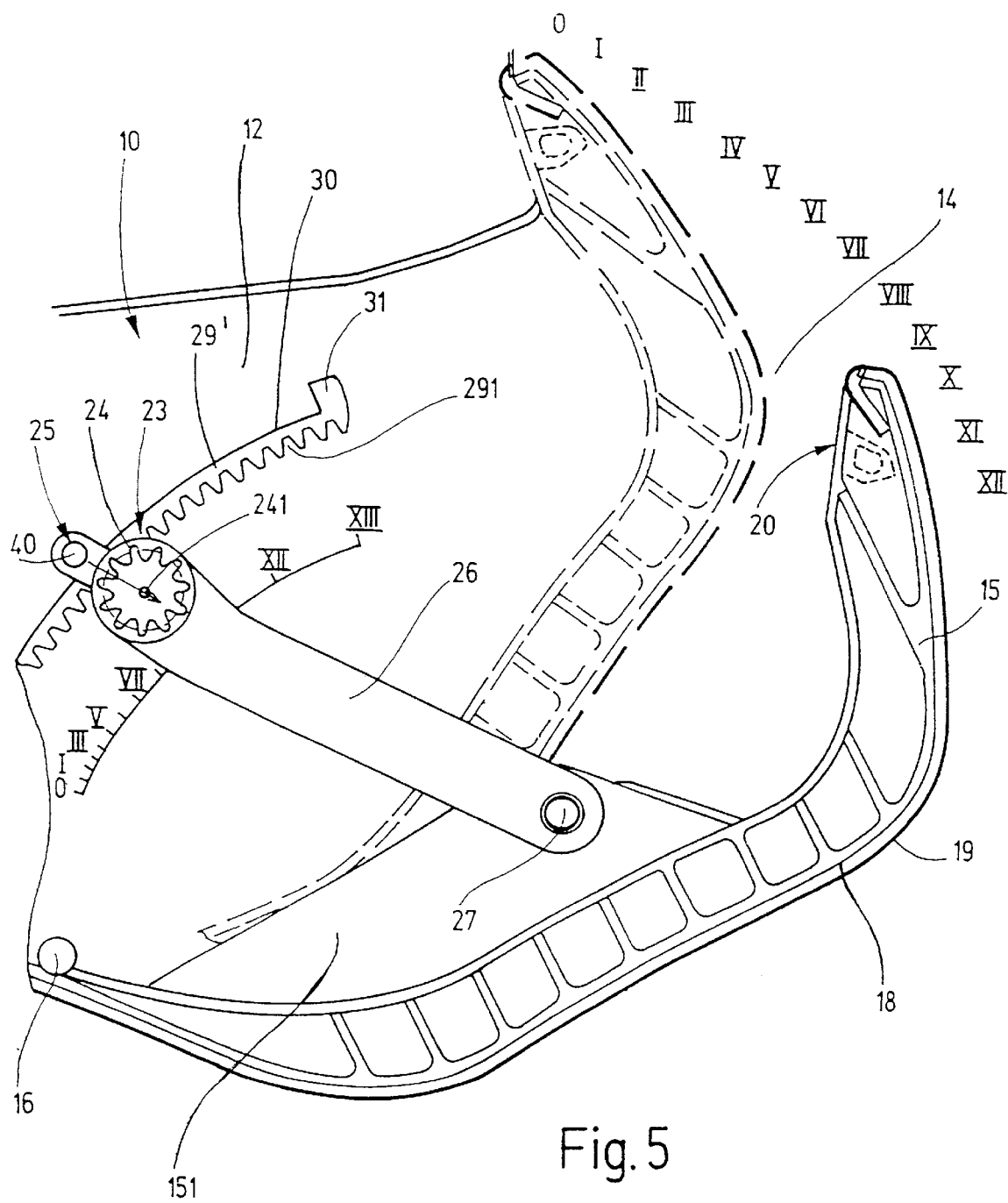
FIG. 5 is a partial view of a cross section of a glove compartment with a door according to another preferred embodiment of the invention.

The additional embodiment of glove compartment 10 with door 15 shown in cross section in FIG. 5 differs from the embodiments described previously in that the locations of pinion 24 and rack 29' of viscous brake 23 on lever 26 and side wall 12 of glove compartment 10 are reversed. While rack 29' in the shape of a section of a circular arc is located in a fixed position on side wall 12, the housing of viscous brake 23 together with pinion 24 rests on lever 26 which as before is articulated to door 15 at pivot point 27. Teeth 291 of rack 29' are located on the inner side of the arc that faces the center of curvature of the circular arc segment, while the guide path 30 for guide element 25 is designed concentrically with respect thereto on the outer arc side of the circular arc segment that faces away from the center of curvature. Guide element 25 located on lever 26 at a radial distance from pivot axis 241 of pinion 24 is designed as a sliding cam 40 that abuts guide path 30 and keeps pinion 24 and rack 291 enmeshed with one another.

In FIG. 5 the pivoting path of door 15 from its closed position (represented by the dashed lines in FIG. 5) to its open position (shown by the solid lines in FIG. 5) is divided into thirteen equal pivot angles or pivot path segments 0–XIII. The pivot positions that lever 26 assumes at each pivot angle 0–XIII of door 15 are marked with the same numbers. When door 15 in FIG. 5 moves clockwise, lever 26 likewise migrates clockwise around its pivot point 27. As can be seen from the number sequence 0–XIII on the pivot path of lever 26, the pivot path traveled in a pivot angle segment of door 15 by lever 26 increases with the increasing opening of glove compartment 10, in other words with additional pivoting of door 15. As described above, this causes the braking torque of viscous brake 23 to increase steadily, reaching its maximum immediately before reaching the maximum opening position of door 15 so that sliding cam 40 strikes relatively gently against stop 31 which is located at the end of rack 29 in the form of a circular arc. Otherwise, the embodiment in FIG. 5 corresponds to the other embodiments so that parts that are the same have been given the same reference numbers.

In all of the embodiments described it is advantageous to provide viscous brake 23 described above with pinions 24, guide elements 25, and levers 26 on both sides of door 15 on each side wall 12 of glove compartment 10. This ensures reliable and sturdy movement kinematics of door 15 even in very wide glove compartments 10.

The invention is not limited to the embodiment described above of a door for a glove compartment in the instrument panel of a vehicle interior. Rather, the invention can be used together with all of its parts that are pivotable between two end positions. Examples of such parts are doors for storage or receiving compartments or auxiliary objects for making the interior more comfortable, such as drinking vessel holders or ashtrays which in the non-use state are stored in a covered opening and are pivoted for use out of this opening either manually or by a motor.

It is also contemplated by the invention to couple the viscous brake to the pivoting movement of the part by means other than a rack and pinion. For example, the pinion can be replaced by a friction wheel, and the rack by a friction rod, by using a friction belt. Spiked rollers and perforated strips are also suitable as drive connections.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Damping device assembly, comprising a part pivotable between first and second end positions, and a viscous brake for delaying the pivoting movement, the brake having a brake wheel and a driving member engaging the wheel at a tangent, wherein the brake wheel and the driving member move relative to one another when, in engagement, the part is pivoted along a pivot path causing a rotation of the brake wheel, wherein one of the brake wheel and the driving member is located in a fixed location and the other is located on a lever, wherein the lever is pivotally connected to the part at a pivotal connection point, wherein the pivotal connection point of the lever is located on the part such that a corresponding displacement of the lever, for any predetermined angle of rotation on the pivot path by the part, increases directly along the pivot path of the part from the first to its second end position, and wherein a free-running decoupling device is provided that operates during a return pivoting of the part from its second to its first end position, the decoupling device disengaging a driving connection between the brake wheel and the driving member.

2. Damping device assembly according to claim 1, wherein the brake wheel is designed as a pinion and the driving member comprises a rack that meshes with the pinion.

3. Damping device according to claim 2, wherein the part is a cover for a motor vehicle glove compartment.

4. Damping device assembly according to claim 2, wherein the part is a motor vehicle door.

5. Damping device assembly according to claim 2, wherein the part is a cover for a drinking vessel holder.

6. Damping device according to claim 1, wherein the part is a cover for a motor vehicle glove compartment.

7. Damping device assembly according to claim 1, wherein the part is a motor vehicle door.

8. Damping device assembly according to claim 1, wherein the part is a cover for a drinking vessel holder.

9. Damping device assembly, comprising a part pivotable between first and second end positions, and a viscous brake for delaying the pivoting movement, the brake having a brake wheel and a driving member engaging the wheel at a tangent, wherein the brake wheel and the driving member move relative to one another when, in engagement, the part is pivoted along a pivot path causing a rotation of the brake wheel, wherein one of the brake wheel and the driving member is located in a fixed location and the other is located on a lever wherein the lever is pivotally connected to the part at a pivotal connection point, wherein the pivotal connection point of the lever is located on the part such that a corresponding displacement of the lever, for any predetermined angle of rotation on the pivot path by the part, increases directly along the pivot path of the part from the first to its second end position, and, wherein the driving member has associated with it a first guide path that extends parallel thereto and the brake wheel has associated with it a guide element that is located radially at a distance from the brake wheel rotational axis, said guide element abutting the first guide path during relative movements thereof, wherein the guide element and the first guide path are so arranged that the brake wheel and the driving member are held in mutual engagement, and wherein a free-running decoupling device is provided that operates during return pivoting of the part from its second to its first end position, the decoupling device disengaging a driving connection between the brake wheel and the driving member.

10. Damping device assembly according to claim 9, wherein a stop is provided at the end of the first guide path, with the guide element striking the stop when the second end position of the part is reached.

11. Damping device assembly according to claim 10, wherein the brake wheel is designed as a pinion and the driving member comprises a rack that meshes with the pinion.

12. Damping device according to claim 9, wherein the decoupling device is formed by a second guide path that extends at a distance from and parallel to the first guide path such that when the guide element abuts the second guide path brake wheel and the drive member are out of engagement, and wherein the first and second guide paths are connected with one another at their two ends by switches at each end in such fashion that the guide element is forcibly transferred to the respective other guide path.

13. Damping device according to claim 12, wherein a stop that determines the second end position of the part is also provided on one of the switches.

14. Damping device assembly according to claim 12, wherein the brake wheel is designed as a pinion and the driving member comprises a rack that meshes with the pinion.

15. Damping device assembly according to claim 14, wherein the rack is located on the lever and extends in a straight line in a lengthwise direction of the lever, and wherein the guide path is formed on a guide strip that extends along the lever on a side that faces the rack.

16. Damping device according to claim 9, wherein the brake wheel is designed as a pinion and the driving member is designed as a rack that meshes with the pinion.

17. Damping device assembly according to claim 16, wherein the rack is located on the lever and extends in a straight line in a lengthwise direction of the lever, and wherein the guide path is formed on a guide strip that extends along the lever on a side that faces the rack.

18. Damping device according to claim 17, wherein the rack and the guide strip form arms of a closed fork that is provided on the lever, said fork surrounding the pinion and the guide element.

19. Damping device according to claim 18, wherein the guide element is designed as an arc segment formed on a fixed housing of the viscous brake.

20. Damping device according to claim 17, wherein the guide element is designed as an arc segment formed on a fixed housing of the viscous brake.

21. Damping device according to claim 17, wherein the part is a cover for a motor vehicle glove compartment.

22. Damping device assembly according to claim 17, wherein the part is a motor vehicle door.

23. Damping device assembly according to claim 17, wherein the part is a cover for a drinking vessel holder.

24. Damping device according to claim 16, wherein the rack is located in a fixed position as an arcuate segment, with teeth formed on a side of the arcuate segment that faces its center of curvature, wherein the guide path is made concentric with respect to teeth on the side of the arcuate segment that faces away from the center of curvature, and wherein the guide element is a sliding cam located at a free end of the lever.

25. Damping device, comprising a viscous brake for delaying the pivoting movement, the brake having a brake wheel and a driving member engaging the wheel at a tangent, wherein the brake may be attached to an attachable part which can move between first and second end positions, wherein the brake wheel and the driving member, when in engagement, move relative to one another provided the attachable part is attached and moved along a path causing a rotation of the brake wheel, wherein one of the brake wheel and the driving member may be located in a fixed location and the other is located on a lever, wherein the lever is movably connectable at a connection point to the attachable part, wherein the connection point of the lever may be located on the attachable part such that a corresponding displacement of the lever, for any predetermined angle of rotation on the path by the part, increases directly along the path of the part from the first to its second end position, and wherein a free-running decoupling device is provided that can operate during a return moving of the attachable part from its second to its first end position with the decoupling device disengaging a driving connection between the brake wheel and the driving member.

* * * * *